United States Patent
Acker et al.

(10) Patent No.: US 9,658,845 B2
(45) Date of Patent: May 23, 2017

(54) GENERATING A WHERE-USED OBJECTS LIST FOR UPDATING DATA

(75) Inventors: Michael Acker, Grossfischlingen (DE); Franz-Josef Stortz, Edenkoben (DE); Juergen Remmel, Muehlhausen (DE)

(73) Assignee: SAP SE, Walldorf (DE)

( * ) Notice: Subject to any disclaimer, the term of this patent is extended or adjusted under 35 U.S.C. 154(b) by 1110 days.

(21) Appl. No.: 12/641,387

(22) Filed: Dec. 18, 2009

(65) Prior Publication Data

US 2011/0154311 A1    Jun. 23, 2011

(51) Int. Cl.
*G06F 9/45* (2006.01)
*G06F 9/44* (2006.01)

(52) U.S. Cl.
CPC .................................. *G06F 8/71* (2013.01)

(58) Field of Classification Search
CPC ............................................. G06F 8/71
USPC ............................................. 717/172
See application file for complete search history.

(56) References Cited

U.S. PATENT DOCUMENTS

| | | | | |
|---|---|---|---|---|
| 2003/0023963 | A1* | 1/2003 | Birkholz et al. | 717/172 |
| 2003/0145315 | A1* | 7/2003 | Aro et al. | 717/170 |
| 2003/0229890 | A1* | 12/2003 | Lau et al. | 717/168 |
| 2008/0209400 | A1* | 8/2008 | Parker et al. | 717/122 |
| 2009/0083268 | A1* | 3/2009 | Coqueret et al. | 707/6 |

* cited by examiner

*Primary Examiner* — Li B Zhen
*Assistant Examiner* — Lenin Paulino

(57) ABSTRACT

Methods and systems are described that involve creating a where-used objects list that contains a set of provider's objects to be adjusted or tested in a customized program after an upgrade of a program, import of projects, patches, and so on. A set of contracts is created that corresponds to the set of provider's objects used in the customer system. Each contract contains information about the provider's object it is created for and assigned to. This information is used by a lifecycle tool to detect if a provider's object has been changed by comparing the contract information of the provider's object with a new imported version of the same provider's object. The provider's object is modified according to the detected change and the assigned contract is recreated to represent the latest data.

5 Claims, 4 Drawing Sheets

GENERATING A WHERE-USED OBJECTS LIST FOR UPDATING DATA

FIELD OF THE INVENTION

Embodiments of the invention generally relate to the software arts, and, more specifically, to methods and systems for generating a where-used objects list that contains software objects to be considered for changes and testing after an upgrade (e.g., of a system and import of service patches).

BACKGROUND OF THE INVENTION

Standard enterprise applications cannot cover all possible customer environments, industries, practices, and requirements. Some application platforms, such as SAP NetWeaver provided by SAP AG from Walldorf Germany offer a platform for building and deploying customer or scenario specific applications that is based on a standard offering. Usually, the customer applications are copied or they reuse parts from the common business applications provided by a given software provider. Therefore, when a provider's application has been changed due to bug fixing or embedding of new functionality, the customer application has to be changed as well. Often times, the changed standard provider's application is obtained via a software patch or service package of a product. The patch may be delivered in a number of different ways including being made available as a download from the Internet site of the company offering the given product. Usually, the patch does not contain the new version of the software in its entirety, just the changes that need to be made. The customer applications affected by these changes have to be adjusted and updated. Ascertaining which parts of the standard application have been changed and which are applicable to which application is a complex task. It is not desirable to test every customer application. The provider's application is a program (or a software product in general) that contains a number of modules and features that perform given functionality. The provider's application is offered to all customers. When a customer buys the provider's product and develops additional features or modules inside the product (or modifies existing ones) and customizes it by his or her needs and requirements, the product becomes a customized product; customer applications are such customized products.

Some software lifecycle solutions provide a list of objects that have to be adjusted or tested after an upgrade or import of patches. These solutions usually scan the actual system and compare the usage of a given object against another not yet upgraded system or against a database. Copied programs are detected by comparing source code lines. If the amount of equal lines is higher than a given threshold, the heuristic assumes it is copied.

SUMMARY OF THE INVENTION

Methods and systems are described that involve generating a where-used objects list for updating data. In one embodiment, the method includes receiving a new version of a provider's object, wherein the provider's object is used in a customized program. A contract is associated with the provider's object. Further, data from the contract of the provider's object is compared with the new version of the provider's object and a change of the provider's object in the new version of the provider's object is detected. Finally, a where-used objects list is provided with changed provider's objects.

In one embodiment, the system includes a repository unit that stores a set of provider's objects used by a provider's program and a set of custom objects used by a customized program. The system also includes a development platform that enables one or more of copying the provider's program into the customized program and a direct usage of a provider's object from the set of provider's objects into the customized program. Further, the system includes a where-used objects unit that stores a set of contracts, wherein a contract from the set stores information about the provider's object. Finally, an import tool compares the contract of the provider's object with a new version of the provider's object and detects a modification in the new version of the provider's object.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
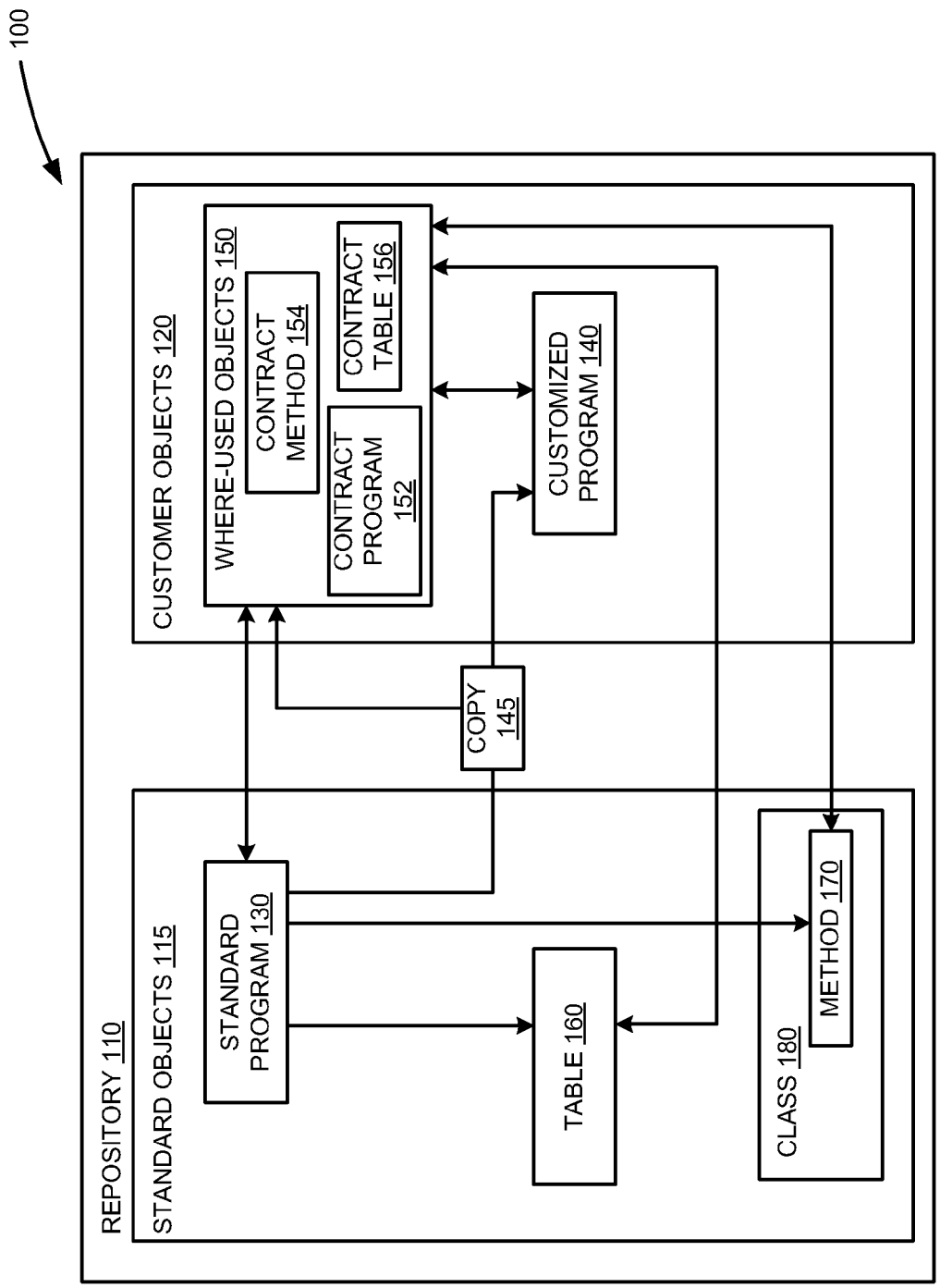
FIG. 1 is a diagram of an embodiment of a method for copying a provider's program into a customized program.

Embodiments of techniques for generating a where-used objects list for updating data are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

During a lifecycle operation (e.g., upgrade, transport) of a software product, a development object (such as a program) may be copied from one software component into another software component. The copied development object may be modified later. A software component is a set of software objects that is independently delivered (e.g. an application, functional modules, etc.). In an embodiment, an object is created during the copy operation called a "contract object" or simply "contract". The contract may contain information such as object name, the name of the copied object, and the source code of the object. Using the contract information, a delivery tool may find all copies of development objects, where the source code has been changed. The copying operation may be performed to update, upgrade or change a deployed version of the object. The contract represents a snapshot of the development object before the copy operation is performed. The contract may be referred to as a container that includes the information needed to detect whether the development object has been changed before the copy operation. The information may include, but is not limited to, metadata, a copy of the source code object, parameters, attributes, and so on. The contracts may be stored in a new development unit such as a where-used objects unit. Where-used lists based on the where-used objects unit show where an object is used in the system, if at all. Inside a development landscape, the contract is transported together with the development object. This allows detecting modifications of the development objects even in a system where the development object was not developed.

The contracts may be assigned to the referred (used) or copied standard (i.e., provider's) objects. In an embodiment, whenever a standard object is upgraded or transported into a system that contains a contract for this standard object, this contract is checked for changes directly as part of the normal lifecycle tools' procedures. Checking a contract means comparing the contract against the newly imported object and the usage by a non-standard object (e.g., a customer object). The result of the comparison may be presented to the user of the non-standard object. The changes of a given standard object could be: irrelevant (does not affect the program's execution), compatible (the changed object is compatible with the customized program and the customized program will run properly), or incompatible (the change is crucial and the customized program will not run properly if the change is not adopted). The incompatible changes need to be adjusted to ensure that the customized program will be executed properly; the compatible changes may be adjusted as well depending on customer's needs. For example, a compatible change could be a modification in the documentation to a given portion of a source code of a program. The customer may want to include this information in his or her program as well and thus to adopt the change. However, this change will not affect the execution of the program in either case, since it is a compatible change.

In an exemplary embodiment, a customized program invokes a method of a given class for accessing and manipulating the data stored in an object. The contract assigned to the method contains the signature of the method and further important attributes of the method such as if the method is declared as static (meaning that it acts at the class level rather than at the instance level) or declared as instance method (the method is exclusively associated with an object). The signature of a method usually includes, but is not limited to, the method's name, the number, types and order of its parameters. After checking the contract, a user may detect the following irrelevant, compatible and incompatible changes. The irrelevant changes may include: 1) the method is not changed; 2) the method is changed from private to protected, package, or public; 3) the method is changed from not final to final; etc. The compatible changes may include: 1) the content of the method is changed; 2) a new optional parameter is added; 3) the documentation is changed; 4) a new exception that inherits an already specified exception is declared; etc. The incompatible changes may include: 1) the method is deleted or renamed; 2) a new not optional parameter is added; 3) the method is changed from public to private, protected, or package and cannot be invoked anymore; 4) a new exception that does not inherit an existing exception is added; 5) an existing parameter is deleted; etc.

In another embodiment, a customized program accesses a database table, wherein the database table is a standard object. The contract assigned to the database table contains access information such as list of fields, attributes, parameters, and so on. After an upgrade of the database that includes the database table, the customized program attempts to access the database table. The contract is checked for changes. As a result the following irrelevant, compatible, and incompatible changes may occur. An irrelevant change may be if the database table contains changed attributes such as owner, changed date, etc. The compatible changes may include: 1) the documentation is changed; 2) fields that are not requested or used is the database access are changed, added, or deleted; etc. The incompatible changes may include: 1) fields that are requested or used in the database access are changed, added, or deleted; 2) the key fields of the table are changed; etc.

In another embodiment, a standard program is copied into or used in a customized program. The contract assigned to the standard program contains the entire program at the time it was copied and all signatures and attributes for any object used by the standard program. After an upgrade of the standard program, the customized program has to be adapted to the new changes (if any). The contract is checked for changes. As a result, the following irrelevant, compatible, and incompatible changes may occur. The irrelevant changes may include: 1) the attributes (e.g., owner, accessibility, etc.) of the standard program are changed; 2) the source code was reformatted without changing a statement (e.g., using a tool to unify the source code such as Pretty Printer); etc. The compatible changes may include: 1) the documentation is changed; 2) new comment lines are added; etc. An incompatible change may be that a statement of the standard program is changed, deleted, or added.

In an embodiment, an import tool is provided that supports a software developer adopting the objects that were changed as a result of reviewing the contracts. The import tool may display the differences of the objects in a three-view editor: a first user interface (UI) element (e.g., window) of the editor to display the old standard object; a second UI to display the new standard object; and a third UI to display the copied or used object. Further, the import tool may provide automatic functionality to adjust the changed standard objects used by the customized program including, but not limited to: rename of a method call when the standard method was renamed; adding of parameters that were newly added in the standard program; adding, changing, or deleting of the source code that was added, changed, or deleted in the standard program; and so on. In addition, a test list may be provided to automatically start executing tests after the customized program is adopted.

FIG. 1 is a diagram of an embodiment of a method for copying a standard program into a customized program. When developing software programs, a user may want to use some standard provider's programs in his or her programs under development. Various development platforms support such functionality. Process 100 shows how a standard provider's program is copied into a customized program. All objects used by different programs or being developed in a given development platform, may be stored in a repository unit such as repository 110. The repository 110 may include objects that are used by the standard programs delivered with a given software product, such as objects 115, and also the objects developed by the customer during development of various customized programs, such as customer objects 120. In an embodiment, the user may want to copy a standard program 130 into a customized program 140 for fulfilling some development needs. During the copy operation 145, a where-used objects unit 150 is created.

The where-used objects unit 150 is linked with the customized program 140, the standard program 130, and a number of standard objects used by the standard program 130 (for example, table 160 and method 170 of class 180). The where-used objects unit 150 contains the contracts assigned to the standard program 130 and the used objects. In an embodiment, the where-used object unit 150 may include: a contract program 152 that contains information about standard program 130 such as the relevant source code; a contract method 154 that contains information about method 170 such as the names and types of all used parameters of method 170 in class 180; contract table 156 that contains information about table 160 such as the names and types of all used fields of table 160; etc. These contracts contain all relations to the standard objects 115 (e.g., table 160 and method 170 of class 180) that when some of the used objects of standard objects 115 are changed, may cause the customized program 140 to run incorrectly. The stored data of the contracts in the where-used objects unit 150 may be compressed to save resources (e.g., disk space) by using text compressing algorithms, by removing some irrelevant information such as comments, documentation, etc., and other downsizing techniques.

In an embodiment, method 170 of class 180 was changed by the provider of the standard program 130. For example, a parameter in the method definition is removed. The standard program 130 is adjusted and adapted to the new method accordingly by the software provider. The class 180 and the standard program 130 may be delivered to a customer via an upgrade, a patch, a support packages, or a similar module. A delivery procedure (e.g., upgrade or service package import) may be performed at the customer's system by a corresponding tool, such as an import tool (e.g., upgrade tool). During the delivery procedure, the import tool compares line by line the new data with the data stored in the contracts. Thus, the import tool may detect that a parameter in method 170 of class 180 was removed (since the contract of method 170 contains the copied source code of the method itself). At the end of the delivery procedure, the import tool may provide a list of customer objects (as part of customer objects 120) that may be affected by changes and may need to be adjusted. In an embodiment, this list shows objects from the where-used objects unit 150 that includes the contracts. Since method 170 was changed and the customized program 140 uses this method 170, the customized program 140 may have to be changed. The import tool may point the user to the customized program 140 that uses method 170 to be modified. In an embodiment, the import tool may allow the user to navigate from the tool to the standard object used in the customized program 140 to adopt the changes (e.g., via a clickable link). Modifying the customer program 130 to include the changes results in recreating the contracts that correspond to the modified standard objects, stored in the where-used objects unit 150. Thus, the contracts will include the last version of the stored information. The same algorithm as for creating the where-used objects unit 150 during the initial copy operation of the program can be used for the recreation.

Figure 2:
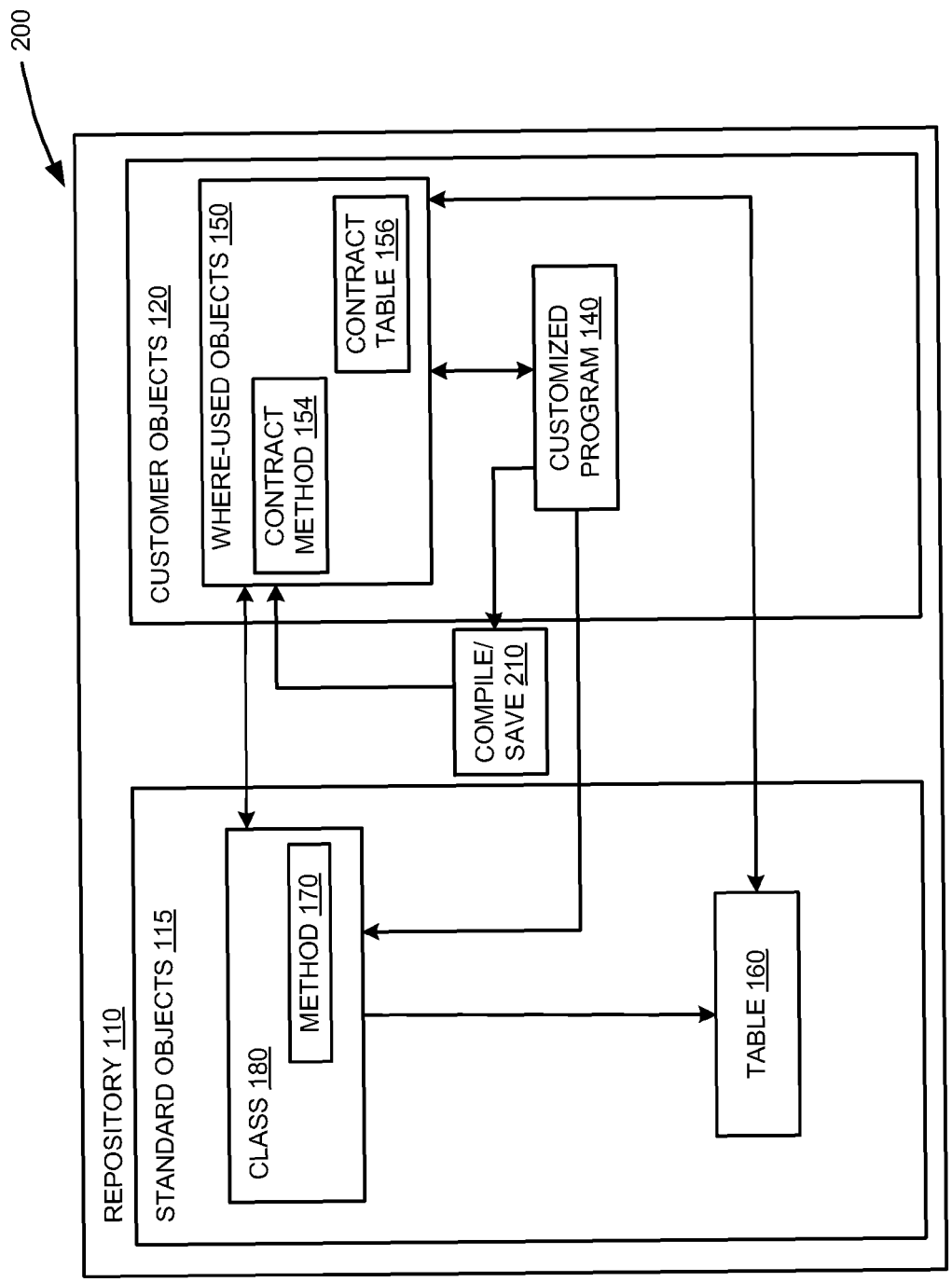
FIG. 2 is a diagram of an embodiment of a method for using an object of a provider's program into a customized program.

FIG. 2 is a diagram of an embodiment of a method for propagating changes of object of a standard program into a customized program. When developing software programs, a user may want to use some parts or objects of a program in his or her program under development. This suggests that the standard program 130 is not copied into the customized program 140, but only parts (e.g., objects) from the standard program 130 are used in the customized program 140. Process 200 shows how a method of a standard program 130 is used by a customized program 140. In an embodiment, customized program 140 uses method 170 of class 180. Class 180 uses table 160 for storing the parameters of the method 170. The method 170, the class 180, and the table 160 are created and used by a program such as standard program 130 (in FIG. 1). When developing customized program 140, the user may use method 170 in the source code of the program. Upon saving or source code compilation 210 of the customized program 140, the contracts for the used standard objects are created and stored in the where-used objects unit 150. The where-used objects 150 list includes the contracts of the used objects such as contract method 154 and contract table 156. The contracts contain information about the used parts of the objects. For example, the names and types of all used parameters of method 170 in class 180 and the names and types of all used fields of table 160. Similar to the created where-used object unit of FIG. 1, the stored data in the list could be compressed to free up resources by different downsizing techniques.

In an embodiment, table 160 is changed (e.g., a field was removed) by a program such as standard program 130 at the program's provider side. Class 180 that uses table 160 is adjusted with the change by the provider of the standard program 130 (in FIG. 1). Class 180 and table 160 may be delivered to the customer via standard delivery procedures including, but not limited to, program upgrade, import of a patch, import of a service pack, and so on. Since customized program 140 uses method 170, whose parameters are stored in table 160, any change in the table 160 may result in a syntax error. Thus, customized program 140 may have to be adjusted as well. During the delivery procedure, the import tool compares the new data with the data stored in the contracts. Thus, the import tool can detect that a field in table 160 was removed (since the contract of table 160 contains the fields of the table itself). At the end of the delivery procedure, the import tool may provide a list of customer objects (as part of customer objects 120) that are affected by changes and may need to be adjusted. In an embodiment, this list shows objects from the where-used objects unit 150 that includes the contracts. In an embodiment, the import tool may allow the user to navigate from the tool to the customized program 140 to adopt the changes. Changing the customized program 140 to include the changes results in recreating the contracts of the modified standard objects in the where-used objects unit 150. The same algorithm as for creating the where-used objects unit 150 during saving or compiling of the customized program can be used for the recreation.

Figure 3:
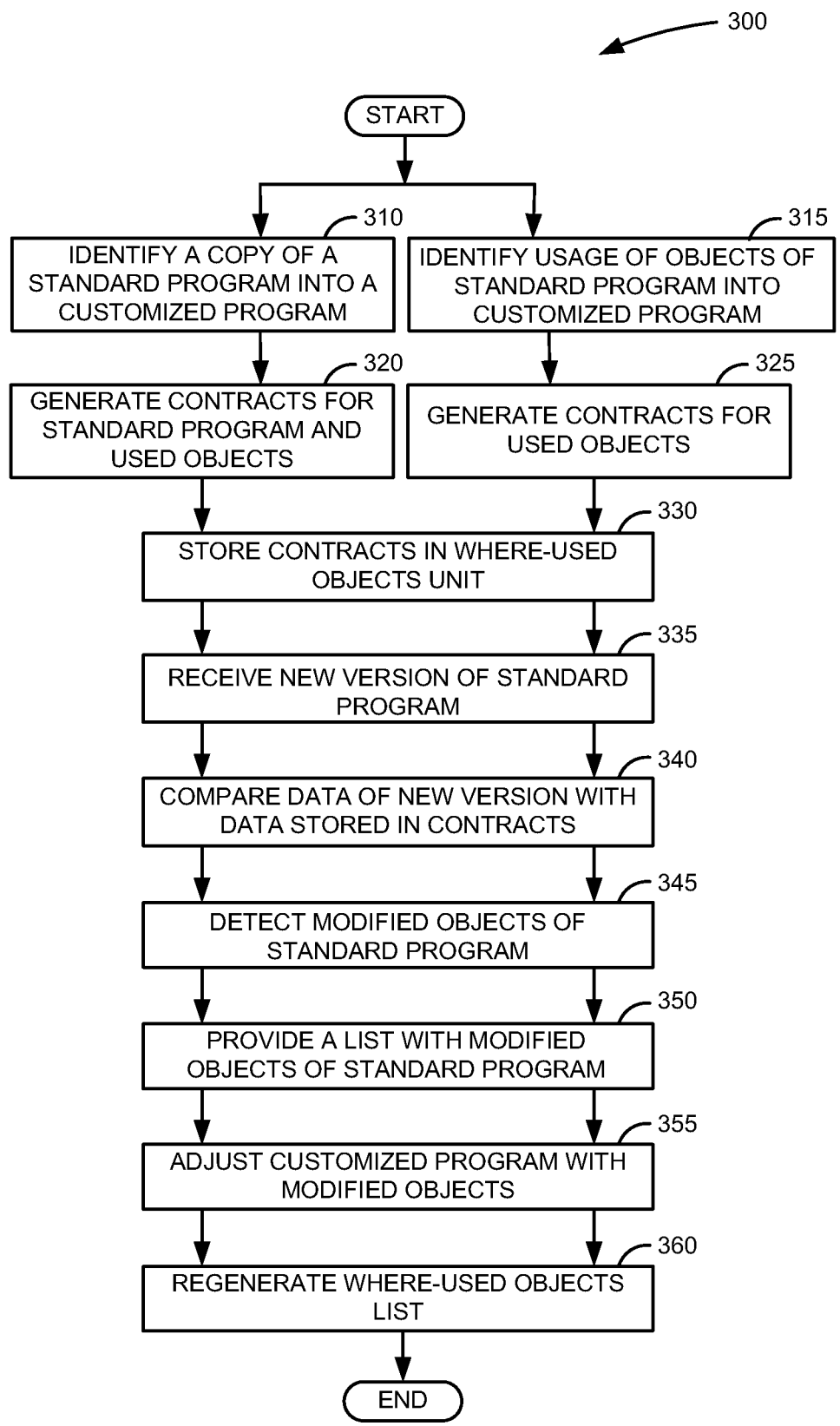
FIG. 3 is a flow diagram of an embodiment for updating a customized program with provider's objects using contracts.

FIG. 3 is a flow diagram of an embodiment for updating a customized program with standard objects using contracts. Process 300 includes steps of a method for updating a customized program (e.g., customized program 140) with standard objects of a provider's program (e.g., standard program 130) that have been modified by the program's provider. It should be noted that the standard program is a provider's program that uses a plurality of standard (provider's) objects, developed by a certain software provider and available to all customers that may want to use it. The customized program, on the other hand, is developed by a certain customer and may or may not include parts (e.g., components, modules, objects, etc.) or the entire standard program. In an embodiment, the customer may decide to use the entire program as basis for developing his or her customized program. At block 310, a copy of the standard program 130 into the customized program 140 is identified. The standard program 130 may be copied into the customized program by copying folders into folders in the file system. In an alternative embodiment, this may be done via an import operation in a development platform. During the copy operation, at block 320, a set of contracts is generated for the standard program and for all standard objects used by the customized program. The contracts contain information about the standard program and the used standard objects. For example, the contract generated and assigned to the standard program contains a copy of the entire source code of the program.

In another embodiment, the customer may want to use just some particular parts of the standard program, such as a method, a database table, etc. Accordingly, at block 315, usage of a set of standard objects when developing a customized program is identified (e.g., imported via a development platform). While saving (or compiling) the customized program with the newly used set of standard objects, a contract is generated for each of the used objects in the set, at block 325. The contracts contain information about the used objects. For example, if a method is used in the customized program, the generated contract contains, for example, the names and types of parameters of the methods used. At block 330, all generated contracts (discarding the generation scenario) are stored in a where-used objects unit. Some point later, a new version of the standard program may be available from the program's provider. This new version may contain objects that are used by the customized program and have been modified by the provider. At block 335, the new version of the program is obtained by the customer. The new version may be delivered by a support package, a patch, and so on. The customer may use an import tool or other solution to apply the new version of the standard program. During the update procedure, a check for changes may be performed by the import tool. At block 340, the data from the new version is compared with the stored data from the contracts. For example, if a given method is used by the customized program and there is a contract for this method in the where-used objects unit, the version of the method that is provided with the new version of the standard program is compared with the contract of the method. Since the contract contains all necessary information about the method (such as parameters, attributes, etc.), a difference between the two versions can be established, if there is any.

At block 345, if there are any modified objects of the standard program that are used by the customized program, these objects are detected by the import tool in response to the comparison with the contracts. At block 350, a list of the used modified objects is generated and provided to the user. The changes in the standard objects could be compatible, incompatible, or irrelevant. Depending on the type of the change, the user may decide which change to adopt in the customized program. In an embodiment, the update procedure may provide a direct navigation (e.g., a link) to the customized program where the objects are used. At block 355, the customized program may be adjusted according to the modified objects. At block 360, the contracts are recreated and the where-used objects unit is regenerated as result of the modifications. The customized program is updated and the contracts contain the latest information. Using contracts for the standard objects used by a customized program decreases the effort of applying new versions of a standard program. The contracts enable fast and easy comparison between the new data and the old data whenever standard objects are used or copied.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 4:
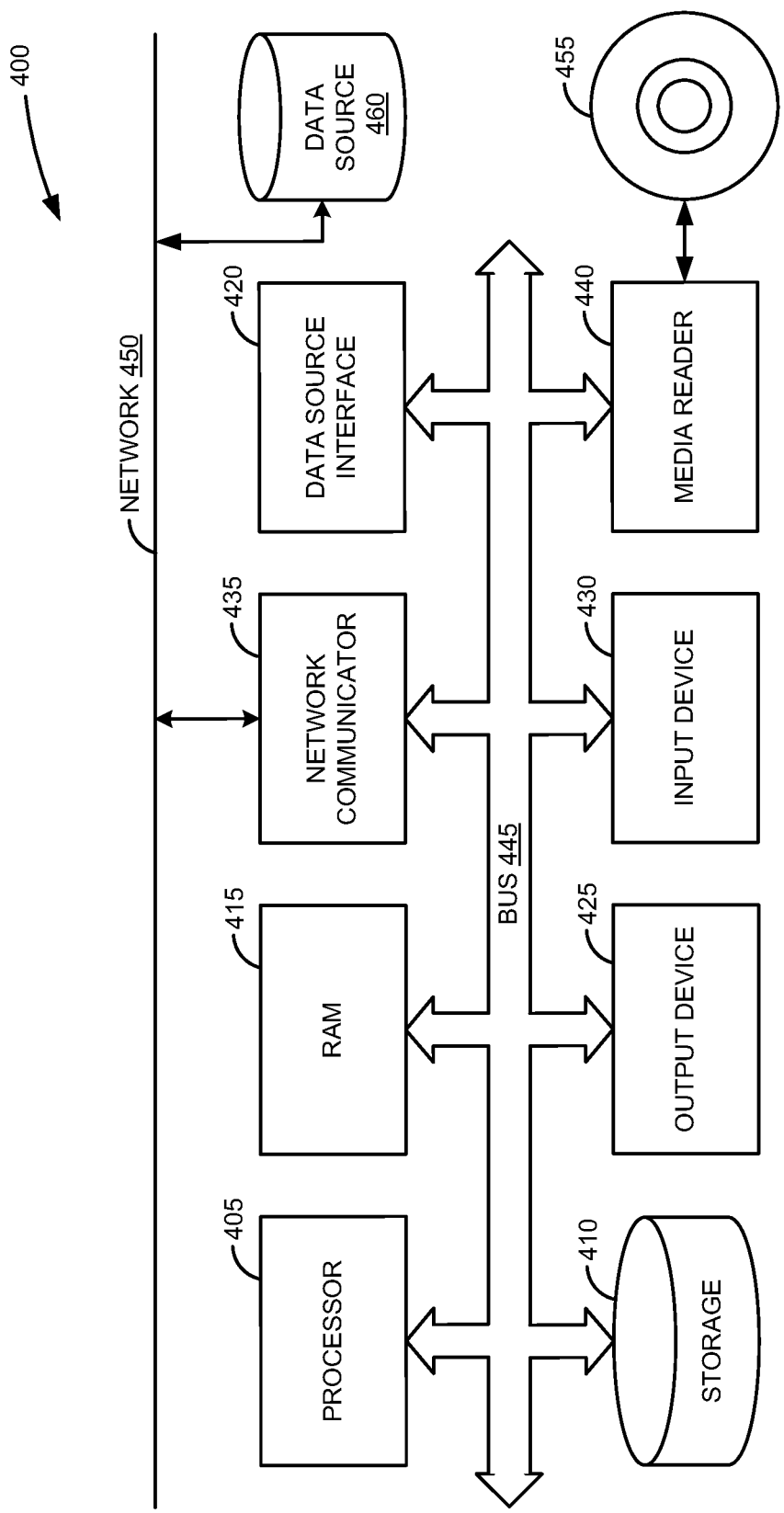
FIG. 4 is a block diagram of an exemplary computer system 400.

FIG. 4 is a block diagram of an exemplary computer system 400. The computer system 400 includes a processor 405 that executes software instructions or code stored on a computer readable medium 455 to perform the above-illustrated methods of the invention. The computer system 400 includes a media reader 440 to read the instructions from the computer readable medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment of the invention, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be access via one or more abstraction layers implemented in hardware or software. For example, the data source 460 may be access by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer-readable storage medium storing computer-readable instructions thereon, which when executed by a computer, cause the computer to:
receive a new version of a provider's program, wherein a current version of the provider's program comprising used objects is used in a customized program, the customized program comprising the provider's program plus one or more additional features added to the provider's program or one or more modifications to existing features of provider's program for a customer that are not included in provider's program for all customers, and wherein contracts are assigned to the current version of the provider's program and to the used objects, and wherein the contracts comprise information to describe content of the current version of the provider's program with the used objects and relations of the used objects to other objects from the customized program, and wherein the new version of the provider's program comprises modified versions of one or more of the used objects in the current version of the provider's program;
compare the new version of the provider's program with the contracts assigned to the current version of the provider's program and to the used objects;
based on the comparison, detect one or more modifications in a set of used objects from the current version of the provider's program;
identify a type of the one or more modifications, wherein the type of the one or more modifications is selected from the group consisting of compatible, incompatible, and irrelevant;
generate a where-used objects list with a set of objects from the current version of the provider's program used in the customized program, wherein the set of objects from the current version of the provider's program used in the customized program includes set of used objects comprising the detected one or more modifications;
generate the contracts during a first copy of the provider's program in the customized program and store the contracts in a where-used object unit;
regenerate the contracts when at least one of a request to adopt, a request to adjust, and a request to ignore the detected one or more modifications is received;
provide a navigational link in the where-used objects list to the set of objects in the customized program;
receive a request to adopt a first modification from the detected one or more modifications in the customized program, when the identified type of the one or more modifications is compatible;
receive a request to adopt and adjust a second modification from the detected one or more modifications in the customized program, when the identified type of the one or more modifications is incompatible; and
receive a request to ignore a third modification from the detected one or more modifications in the customized program, when the identified type of the one or more modifications is irrelevant.

2. The computer-readable storage medium of claim 1, further comprising instructions which when executed by the computer cause the computer to determine whether the provider's program is referred to or copied in the customized program.

3. A computer implemented method comprising:
receiving a new version of a provider's program comprising modified objects, wherein a current version of the provider's program comprising used objects is used in a customized program, the customized program comprising the provider's program plus one or more additional features added to the provider's program or one or more modifications to existing features of provider's program for a customer that are not included in provider's program for all customers, and wherein contracts are assigned to the current version of the provider's program and to the used objects, and wherein the contracts comprise information to describe content of the current version of the provider's program with the used objects and contain relations of the used objects to other objects from the customized program, and wherein the new version of the provider's program comprises modified versions of one or more of the used objects in the current version of the provider's program;

comparing the new version of the provider's program with the contracts assigned to the current version of the provider's program and to the used objects;

based on the comparison, detecting one or more modifications in a set of used objects from the current version of the provider's program;

identifying a type of the one or more modifications, wherein the type of the one or more modifications is selected from the group consisting of compatible, incompatible, and irrelevant;

generating a where-used objects list with a set of objects from the current version of the provider's program used in the customized program, wherein the set of objects from the current version of the provider's program used in the customized program includes the set of used objects comprising the detected one or more modifications;

generating the contracts during a first copy of the provider's program in the customized program and storing the contracts in a where-used object unit;

regenerating the contracts when at least one of a request to adopt, a request to adjust, and a request to ignore the detected one or more modifications is received;

providing a navigational link in the where-used objects list to the set of objects in the customized program;

receiving a request to adopt a first modification from the detected one or more modifications in the customized program, when if the identified type of the one or more modifications is compatible;

receiving a request to adopt and adjust a second modification from the detected one or more modifications in the customized program, when the identified type of the one or more modifications is incompatible; and receiving a request to ignore a third modification from the detected one or more modifications in the customized program, when the identified type of the one or more modifications is irrelevant.

4. The method of claim 3, further comprising determining whether the provider's program is referred to or copied in the customized program.

5. A computing system comprising:

a processor; and a memory in association with the processor storing instructions related to:

a repository unit to store a set of provider's objects used by a provider's program and a set of custom objects used by a customized program;

a development platform to enable usage of the provider's program into the customized program, the customized program comprising the provider's program plus one or more additional features added to the provider's program or one or more modifications to existing features of provider's program for a customer that are not included in provider's program for all customers, and a direct usage of a provider's object from the set of provider's objects in the customized program;

a where-used objects unit to store a set of contracts, wherein the set of contracts are assigned to a used provider's program and used provider's objects, and wherein the set of contracts comprise information to describe content of the used provider's program with the used provider's objects and contain relations of the used objects to other objects from the customized program;

an import tool to:

compare the set of contracts for the used provider's program and the used provider's objects with a new version of the used provider's program and the used provider's objects and to detect one or more modifications in a set of comprised used provider's objects from the used provider's program, wherein the new version of the used provider's program comprises modified versions of one or more of the used provider's objects in the used provider's program, and wherein a type of the one or more modifications is selected from the group consisting of compatible, incompatible, and irrelevant;

generate a where-used objects list with a set of objects from the used provider's program, wherein the set of objects includes the set of used provider's objects comprising the detected one or more modifications;

generate the contracts during a first copy of the provider's program in the customized program and store the contracts in a where-used object unit;

regenerate the contracts when at least one of a request to adopt, a request to adjust, and a request to ignore the detected one or more modifications is received;

provide a navigational link to the provider's object in the customized program for changing the provider's object in response to the detected one or more modifications;

receive a request to adopt the detected one or more modifications in the customized program, when the identified type of the one or more modifications is compatible;

receive a request to adopt and adjust the detected one or more modifications in the customized program, when the identified type of the one or more modifications is incompatible; and receive a request to ignore the detected one or more modifications in the customized program, when the identified type of the one or more modifications is irrelevant.

* * * * *